United States Patent [19]

Smith et al.

[11] 4,206,038
[45] Jun. 3, 1980

[54] HYDROGEN RECOVERY FROM GASEOUS PRODUCT OF FLUIDIZED CATALYTIC CRACKING

[75] Inventors: Randlow Smith; Henry B. Jones, both of Houston, Tex.

[73] Assignee: Texaco Inc., White Plains, N.Y.

[21] Appl. No.: 918,989

[22] Filed: Jun. 26, 1978

[51] Int. Cl.² .......................... B01J 8/24; B01J 23/94; C01B 1/18
[52] U.S. Cl. .................................... 208/113; 208/120; 208/150; 208/164; 252/417; 252/415; 423/651
[58] Field of Search ........ 208/113, 120, 164, 150–151; 423/654, 655

[56] References Cited

U.S. PATENT DOCUMENTS

| | | | |
|---|---|---|---|
| 2,129,693 | 9/1937 | Houdry | 208/119 |
| 2,342,856 | 2/1944 | Hall | 208/120 |
| 2,414,002 | 1/1947 | Thomas et al. | 208/164 |
| 2,425,098 | 8/1947 | Kassel | 208/150 |
| 2,429,359 | 10/1947 | Kassel | 208/165 |
| 2,457,255 | 12/1948 | McElherne | 208/150 |
| 2,463,434 | 3/1949 | Shankland | 208/151 |
| 3,120,484 | 2/1964 | Mills et al. | 208/120 |
| 3,844,973 | 10/1974 | Stine et al. | 252/417 |
| 4,071,436 | 1/1978 | Blanton et al. | 208/120 |
| 4,098,677 | 7/1978 | Waghorne | 208/113 |

*Primary Examiner*—Delbert E. Gantz
*Assistant Examiner*—G. E. Schmitkons
*Attorney, Agent, or Firm*—Carl G. Ries; Thomas H. Whaley

[57] ABSTRACT

A fluidized catalytic cracking process wherein regenerated catalyst is stripped with an acid gas for displacing nitrogen, carbon monoxide, and other combustion gases from said regenerated catalysts, and wherein a hydrogen product of high purity and substantially free of nitrogen, carbon monoxide and other non-condensible gases is recovered from cracked vapors from said cracking process.

3 Claims, 1 Drawing Figure

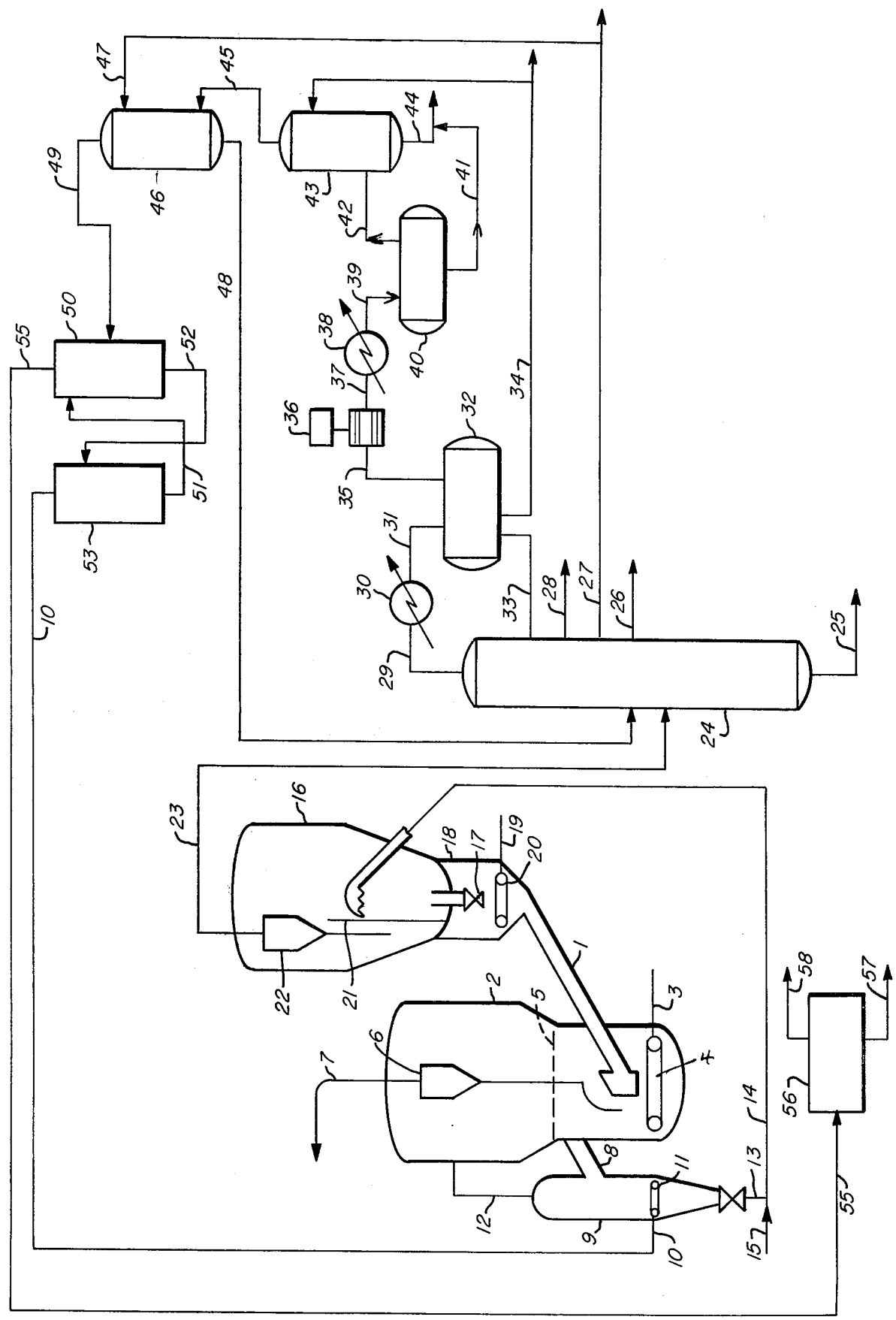

HYDROGEN RECOVERY FROM GASEOUS PRODUCT OF FLUIDIZED CATALYTIC CRACKING

BACKGROUND OF THE INVENTION

Field of the Invention

The present invention relates to fluidized catalytic cracking of hydrocarbon charge stocks. More particularly, it relates to fluidized catalytic cracking wherein a substantial portion of the hydrocarbon charge is converted to hydrogen and wherein said hydrogen is recovered substantially free of contaminant gases, particularly nitrogen.

Fluidized catalytic cracking of hydrocarbon liquids ranging from naphtha through residuum stocks is well known. In such processes, a portion of the hydrocarbon charge is converted to hydrogen and low molecular weight hydrocarbons such as methane and ethane. Although the weight percent of charge converted is small (in the range of 0.5–2 wt. percent), the volume of hydrogen is considerable, considering the low molecular weight of hydrogen and the total weight of hydrocarbon charge to a fluidized catalytic cracking unit. That is, the hydrogen yield from a fluidized catalytic cracking unit charging 100,000 B/D hydrocarbon is in the range of 1.5 to 5 million SCF/D hydrogen. This hydrogen is, however, contaminated with other light gases, such as $C_1$–$C_2$ hydrocarbon, nitrogen, carbon monoxide, carbon dioxide and hydrogen sulfide, and the hydrogen is recovered at a relatively low pressure. Heretofore recovery of the hydrogen as a product has not been economical, but with increased energy costs, such hydrogen recovery is more attractive.

Typically, in fluidized catalytic cracking units, hydrocarbon charge is contacted with hot regenerated catalyst in a reaction zone for cracking the hydrocarbon charge to lighter products. The regenerated catalyst is regenerated with air for burning carbon therefrom and contains nitrogen, carbon monoxide and carbon dioxide entrained therein. As the catalyst circulation rate is high, the amount of entrained nitrogen is substantial. Upon cracking in the reaction zone, hydrocarbon vapors, free of catalyst, flow overhead to a main (or primary) fractionation tower wherein the cracked vapors are fractionated into several liquid fractions and an overhead gaseous fraction.

The overhead fraction comprises hydrogen, nitrogen, carbon oxides, hydrogen sulfide and light hydrocarbons. Commonly, this overhead fraction is compressed to a higher pressure (e.g. in the range of 100–300 psig) and is contacted in an absorber with hydrocarbon liquid wherein a substantial portion of the light hydrocarbons are absorbed such that substantially only $C_1$–$C_2$ hydrocarbons remain in the gas phase. From the absorber, the remaining gas phase flows to an acid gas treater, such as an amine absorber, wherein hydrogen sulfide and carbon dioxide are removed. The remaining gas phase, comprising hydrogen, $C_1$–$C_2$ hydrocarbons, nitrogen and perhaps carbon monoxide is then yielded as a product of the fluidized catalytic cracking process. Commonly this gas product is utilized as fuel gas in the petroleum refinery.

Although it is known to remove light $C_1$–$C_2$ range hydrocarbons from hydrogen streams by such means as cryogenic liquifaction, the nitrogen and carbon monoxide present are much more difficult to remove. Even with the increased value of hydrogen as a product, it is not economically possible to remove the nitrogen and carbon monoxide from the hydrogen.

SUMMARY OF THE INVENTION

Now according to the present invention, we have discovered an improvement in fluidized catalytic cracking that nitrogen and carbon monoxide from the regeneration zone does not enter the reaction zone. Consequently, a hydrogen product of high purity may be obtained.

In a fluidized catalytic cracking process employing one embodiment of the present invention, wherein hydrocarbon charge containing sulfur compounds is contacted with regenerated catalyst in a reaction zone under cracking conditions, wherein cracked hydrocarbon vapors are fractionated in a main fractionation zone into a plurality of liquid fractions and a first gas fraction comprising hydrogen, hydrogen sulfide, and light hydrocarbons, wherein said first gas fraction is treated in a gas recovery zone for removing a substantial portion of said light hydrocarbons and producing a second gas fraction comprising hydrogen, hydrogen sulfide, and $C_1$–$C_2$ hydrocarbons, wherein said second gas fraction is treated in an acid gas treating zone for removal of hydrogen sulfide and any carbon dioxide present thus producing a third gas fraction comprising hydrogen and $C_1$–$C_2$ hydrocarbons; wherein spent catalyst from said reaction zone is regenerated in a regeneration zone by burning coke therefrom with air; and wherein hot regenerated catalyst from the regeneration zone is contacted with additional hydrocarbon charge in the reaction zone; the improvement of the present invention which comprises:

(a) removing regenerated catalyst containing entrained nitrogen and carbon oxides from said regeneration zone into a regenerated catalyst stripping zone;

(b) stripping, in said regenerated catalyst stripping zone, said regenerated catalyst with an acid gas selected from the group consisting of carbon dioxide, hydrogen sulfide and mixtures thereof for removing nitrogen and carbon monoxide from the regenerated catalyst;

(c) contacting, in said reaction zone, hydrocarbon charge with said stripped, regenerated catalyst for producing a first gas fraction substantially free of nitrogen, carbon monoxide and other non-condensible gases;

(d) removing, in said acid gas treating zone, substantially all acid gases from said second gas fraction, for production of a third gas fraction comprising hydrogen and $C_1$–$C_2$ hydrocarbons; and (e) separating, in a hydrogen recovery zone, said third gas fraction into a hydrogen product and a fourth gas fraction comprising $C_1$–$C_2$ range hydrocarbons.

The major advantages of this process comprises production, from a fluidized catalytic cracking process, of hydrogen of a purity suitable for a commercial hydrogen gas product. This advantage and others will be discussed in the detailed description which follows.

BRIEF DESCRIPTION OF THE DRAWING

The drawing is a schematic representation of a fluidized catalytic cracking process embodying the improvements of the present invention

DETAILED DESCRIPTION

Hydrocarbon charge stocks commonly charged to fluidized catalytic cracking units comprise relatively low value hydrocarbons which can be cracked to more valuable compounds. Such charge stocks are generally petroleum fractions or whole crudes and range from naphtha boiling range materials through residuum. Hydrocarbons from other sources, such as tar sands, shale oil, coal liquids, and other sources may also serve as hydrocarbon charge stocks. Hydrocarbon charge stocks for fluidized catalytic cracking units generally contain sulfur compounds, and higher boiling charge stocks contain compounds of metals such as nickel, vanadium, iron, and copper. A substantial portion of the sulfur compounds in hydrocarbon charge stocks are converted to hydrogen sulfide in the cracking process. Substantially all the metal compounds are deposited upon the cracking catalyst.

Generally, in fluidized catalytic cracking processes, the purpose is to produce more valuable, or useful, products from less valuable charge stocks. For example, products such as olefins, naphthas of increased octane number, light gas-oils for fuel, etc. are desired products. However, a significant portion of the hydrocarbon charge stocks are converted to "dry" gases which include hydrogen, methane, ethylene and ethane. Although hydrogen of sufficient purity and high pressure is a valuable comodity, it has heretofore not been economically justifiable to purify and compress hydrogen from fluidized catalytic cracking units. Consequently, the dry gas products from fluidized catalytic cracking units have commonly been utilized as fuel gas in refining processes.

With increases in energy prices, the value of hydrogen has risen, such that, in many instances, it would be profitable to purify and compress the hydrogen produced from fluidized catalytic cracking units. Light hydrocarbons and acid gases are removable from the hydrogen by conventional gas purification techniques. However, "non-condensible" gases, such as nitrogen, carbon monoxide, etc. are more difficult to remove. Consequently, as a result of the presence of such "non-condensible" gasses in the hydrogen, no effort for commercial recovery of hydrogen from fluidized catalytic cracking processes has been attempted.

Nitrogen, carbon monoxide, and other "non-condensible" gases enter the products of fluidized catalytic cracking processes via entrainment with regenerated catalyst. Spent catalyst, contaminated with coke, is withdrawn from a fluidized catalytic cracking reaction zone after being utilized to crack hydrocarbon charge, and is transferred to a regeneration zone. In the regeneration zone coke is burned from the catalyst in the presence of air, yielding nitrogen, carbon oxides, and water. Regenerated catalyst withdrawn from the regeneration zone for use in cracking additional hydrocarbon charge stock contains substantial amounts of entrained nitrogen and combustion gases. As the amount of catalyst circulated is relatively large (about 2 to 20 pounds catalyst per pound of charge) the amount of "non-condensible" gasses entering the reaction is also relatively large. These entrained gasses exit the reaction zone with cracked hydrocarbon vapors and are recovered with the light gas fraction of the cracked products. The water is condensed, and carbon dioxide is easily removed by acid gas treating means. Nitrogen and carbon monoxide are inert, and exit the cracking process with the mixture of hydrogen and light hydrocarbons. Methane, ethylene, ethane and heavier hydrocarbons are removable from the hydrogen by such gas purification means as cryogenic liquifaction, etc. However, the nitrogen and carbon monoxide tend to remain with the hydrogen. Sufficient nitrogen is commonly present to substantially dilute the hydrogen, a carbon monoxide is a catalyst poison. Therefore, hydrogen from a fluidized catalytic cracking unit has not heretofore been useful as hydrogen charge for such processes as hydrogenation, hydrodesulfurization, hydrocracking, etc.

Catalyst utilized in fluidized catalytic cracking processes comprises particles of acidic oxides having small size (10–100μ) and large surface areas. Such catalysts may comprise amorphous compounds such as silica-alumina, silica-zirconia, silica-magnesia, etc., or may comprise crystalline zeolitic alumino-silicates. The zeolysts are compounds of silica and alumina with other metals forming three dimensional crystals having pores or regular cross-sectional area. A large variety of such zeolitic catalysts are known and described in the literature, and such catalysts are widely used commercially in fluidized catalytic cracking processes. Generally, zeolitic catalysts are mixed with amorphous base materials, such as silica-alumina, etc., to form the commercial catalysts. All commercial cracking catalysts, whether zeolitic, amorphous, or combinations thereof, contain voids or pores. In fluidized catalytic cracking processes wherein hydrocarbon charge stocks containing metals (such as nickel, vanadium, iron, copper, etc.) are processed, the metals are deposited upon the catalyst. As the amount of metals deposited upon the catalyst increases, the activity of the catalyst decreases. Consequently, metals contaminated catalyst is withdrawn from the process and fresh catalyst is added to maintain an equilibrium catalyst of desired activity for contact with hydrocarbon charge. The metals upon the catalyst particularly nickel, iron and vanadium have dehydrogenation activity and contribute to production of additional hydrogen from a fluidized catalytic cracking process.

In fluidized catalytic cracking, hydrocarbon charge is contacted with hot, regenerated catalyst in a reaction zone, under cracking conditions, whereupon the hydrocarbon charge is vaporized and cracked. A portion of the charge remains unvaporized and deposits upon the catalyst as coke. Presence of this coke decreases activity of the catalyst, and such coke deactivated catalyst is referred to as spent catalyst. Commonly, spent catalyst from a reaction zone is stripped, in a spent catalyst stripping zone, with steam for removing any volatile materials therefrom, and the stripped catalyst is transferred to a regeneration zone. In the regeneration zone, catalyst undergoing regeneration is maintained as a fluidized bed with upward flowing air, at elevated temperature in the range of 1000°–1500° F. and at pressures in the range of 5–50 psia. Under such conditions, coke is burned with oxygen in the air to form carbon oxides and water. Regenerated catalyst is withdrawn from the fluidized bed into a regenerated catalyst standpipe from which the regenerated catalyst flows for contact with additional hydrocarbon charge.

The regenerated catalyst in the regenerated catalyst standpipe has combustion gases, primarily nitrogen, entrained between the particles and within the pores of the catalyst. Although it is common practice to supply fluidization steam to the catalyst standpipe, to prevent catalyst bridging, this steam is insufficient to displace any substantial amount of gas from the regenerated catalyst. Consequently, substantial amounts of nitrogen and carbon oxides are carried into the reaction zone with the regenerated catalyst. As described above, these noncondensible gases eventually are removed from the process in admixture with the hydrogen product, from which they are removed with difficulty.

Displacing such entrained gases as the nitrogen and carbon oxides from porous solids such as the fluidized cracking catalysts requires something more than simple flushing with a displacement gas. The combustion gases within the catalyst pores must be replaced by the displacement gas. Consequently, a sufficient volume of displacement gas must be employed such that gases entrained within the catalyst pores diffuse out and be replaced with the displacement gas.

According to the present invention, regenerated catalyst, having combustion gases entrained therein, is withdrawn from the regeneration zone into a regenerated catalyst stripping zone. In the regenerated catalyst stripping zone, the regenerated catalyst is contacted with a selected stripping gas in an amount sufficient to strip combustion gas from the catalyst. This stripping gas should be supplied in amounts within the range of about 30–90 SCF stripping gas per 1000 pounds of catalyst, and the regenerated catalyst stripping zone must be of sufficient cross-sectional area to accommodate this flow of gas without entraining the catalyst within the flowing stripping gas. Regenerated catalyst stripping zone vapor flow rates contemplated herein are within the range of about 1–6 ft/sec.

The gases useful for stripping regenerated catalyst are those conveniently removable from the subsequent hydrogen product and preferably are selected from acid gases consisting of carbon dioxide, hydrogen sulfide, and mixtures thereof. These stripping gases must be separable from the hydrogen product and must be easily disposed of. Light hydrocarbons would be satisfactory, except for their cost, and that a substantial portion would be lost from the regenerated catalyst stripper overhead. Steam, in high concentrations, deactivates the cracking catalyst, particularly the zeolitic cracking catalysts.

Carbon dioxide and/or mixtures of carbon dioxide and hydrogen sulfide are commonly available from acid gas scrubbers within petroleum refineries in rather large quantities at nominal expense. Upon use as stripping gas in the regenerated catalyst stripper, the carbon dioxide and/or hydrogen sulfide recovered overhead may conveniently be routed to the fluidized catalytic cracking unit regneration zone wherein hydrogen sulfide is combusted to sulfur dioxide. Alternatively, the hydrogen sulfide from the regenerated catalyst stripper overhead can be routed to a sulfur recovery unit. That portion of the carbon dioxide and hydrogen sulfide entrained within the stripped, regenerated catalyst is removed from the fluidized catalytic cracking process gas fraction in an acid gas scrubber. Such acid gas scrubbers are generally associated with gas recovery sections of fluidized catalytic cracking processes.

DETAILED DESCRIPTION OF THE DRAWING

In order to better describe the process of the present invention, attention is now brought to the drawing. The drawing is a schematic representation of a fluidized catalytic cracking process embodying the improvements of the present invention. The drawing contains only those elements necessary for an understanding of the present invention, and many elements such as piping, instrumentation, pumps, valves etc., normally employed in a fluidized catalytic cracking process have been eliminated for the sake of clarity. The process shown in the drawing, and described below is by way of demonstration only, and is not intended as a limitation of the present invention which is set-out in the appended claims.

In the drawing, spent, coke contaminated cracking catalyst in line 1 flows into the lower portion of regeneration vessel 2. Air, from line 3, flows through nozzle openings in air ring 4 into the bottom of regenerator vessel 2. In regenerator vessel 2, the upwardly flowing air, at a velocity of about 1–6 ft./sec., aerates the spent catalyst, producing a fluidized dense phase bed of catalyst having a bulk density in the range of about 20–40 pounds per cubic foot and having an upper surface 5. Within the regenerator dense phase bed, coke on the spent catalyst is burned with oxygen present in the regeneration air, at regeneration conditions including temperatures in the range of about 1100–1500° F. and pressures in the range of about 5–500 psig, thereby producing regenerated catalyst of reduced carbon content and spent regeneration gas comprising about 80 mole percent nitrogen, about 1–5 mole percent oxygen, about 8–16 mole percent carbon dioxide, about 0–8 mole percent carbon monoxide and about 3–6 percent water. Spent regeneration gas separates from the dense phase bed upper surface 5 and enters a dilute phase in the upper portion of regenerator vessel 2. From the dilute phase, spent regeneration gas flows through cyclone separator 6, for removal of entrained catalyst, and exits regenerator vessel 2 via line 7 as flue gas substantially free of entrained catalyst.

Fluidized, regenerated catalyst, in regenerator vessel 2 dense phase bed, as stated, is at an elevated regeneration temperature of about 1100°–1500° F., and has a fluidized bulk density in the range of about 20–40 pounds per cubic foot. The settled bulk density of such catalyst is in the range of about 60–100 pounds per cubic foot. Consequently, the fluidized catalyst bed comprises catalyst suspended in regeneration gas. That is, for example, a fluidized bed having a settled bulk density of 80 pounds per cubic foot suspended in regeneration gas consists of about 31.8 volume percent catalyst and about 69.2 volume percent gas filled pores and interstitial voids. As stated previously, the gas suspending the catalyst in the fluidized bed is about 80% nitrogen.

Without regenerated catalyst stripping, as disclosed herein, a substantial portion of the regeneration gas present in the catalyst pores and voids of the fluidized bed is transferred along with the regenerated catalyst into a reaction zone, to be described hereinafter, and subsequently through the fluidized catalytic cracking process where it is finally produced in admixture with hydrogen and other nominally non-condensible gases. And, without such regenerated catalyst stripping, the molar ratio of nitrogen in admixture with hydrogen may be in the range of about 1.5/1 to about 0.8/1 respectively, thus rendering the hydrogen useful only as fuel gas. However, according to the present invention, when regenerated catalyst stripping is employed, substantially all the nitrogen may be removed from the catalyst prior to entry into the reaction zone, and the molar ratio of nitrogen to hydrogen in the product gas may be reduced to about 0.25/1, and preferably less.

In the drawing, according to the present invention, fluidized regenerated catalyst, having regeneration gas entrained therein, flows from regenerator vessel 2 via regenerated catalyst duct 8 into regenerated catalyst stripper 9. Stripping gas, preferably selected from hydrogen sulfide, carbon dioxide and mixtures thereof, from line 10 flows through nozzle openings in distributor ring 11 into the lower portion of regenerated catalyst stripper 9. The volume of stripping gas (calculated at standard conditions) is at least equivalent to the volume of fluidized catalyst entering regenerated catalyst stripper 8 and is preferably in the range of about 1 to 4 standard cubic feet of stripping gas per cubic foot of catalyst flow through regenerated catalyst stripper 9. That is, the stripping gas flow is preferrably in the range of 30 to 120 SCF per 1000 lbs. catalyst circulation. In regenerated catalyst stripper 9, catalyst flow is substantially downward and stripping gas flow upward such that regeneration gas is displaced from the catalyst. Consequently, stripping gas flow rates are preferably in the range of about 1 to 6 ft./sec. within regenerated catalyst stripper 9. Regeneration gas displaced from the regenerated catalyst and stripping gas flow upward from regenerated catalyst stripper 9 via line 12 into the upper portion of regenerator vessel 2 wherein a dilute regeneration gas phase is maintained. In regenerator vessel 2, combustible stripping gas components are burned with oxygen, e.g. $H_2S$ is burned to $SO_2$, and non-combustible components, e.g. $CO_2$, $N_2$ and combustion products pass out of regenerator vessel 2 as components of the flue gas via line 7.

In the drawing, stripped, regenerated catalyst, having regeneration gas displaced therefrom by stripping gas, flows downward via line 13 into the lower end of riser transport reactor 14, wherein the catalyst is contacted with hydrocarbon charge from line 15. In riser transport reactor 14, hydrocarbon charge and regenerated catalyst mix at cracking conditions including temperatures in the range of about 800°–1300° F. and pressures in the range of about 5–50 psig, such that a major portion of the hydrocarbon charge is vaporized and cracked, and a minor portion (3–15 wt%) of the hydrocarbon charge accumulates upon the catalyst as coke. Hydrocarbon vapor and catalyst flow upward in riser transport reactor 14 at velocities in the range of about 20–60 ft./sec. and discharge into reactor vessel 16. In reactor vessel 16, catalyst and hydrocarbon vapor separate into a lower regenerator dense catalyst phase and an upper hydrocarbon vapor phase. Spent catalyst, contaminated with coke, flows downwardly from reactor vessel 16 through valve 17 into spent catalyst stripper 18. In spent catalyst stripper 18, volatile hydrocarbons are stripped from the spent catalyst, employing about 1.5 to 5 pounds of steam per 1000 pounds of catalyst. The stripping steam enters the lower portion of spent catalyst stripper 18 via line 17 and steam ring 20. Steam and vaporized hydrocarbon flow from the top of spent catalyst stripper 18 via line 21 into the upper hydrocarbon vapor phase in reactor vessel 16. Stripped, spent catalyst flows from the bottom of spent catalyst stripper 18 via line 1 to regenerator vessel 2, as hereinbefore described.

In the drawing, vapor from the upper portion of reactor vessel 16, which comprises cracked hydrocarbons, stripping gas from regenerated catalyst, and hydrogen sulfide formed from sulfur compounds in the hydrocarbon charge, flows through cyclone separator 22 for removal of any entrained catalyst, and through line 23 to main fractionator 24.

In the drawing, vapor from line 23 is fractionated in main fractionator 24 into a number of desired fractions which include at least a vapor fraction and a liquid fraction. Typically, fractions obtained from a fluidized catalytic cracking unit comprise a heavy cycle gas oil fraction in line 25, an intermediate cycle gas oil in line 26, a light cycle gas oil in line 27, a heavy naphtha fraction in line 28, and a vapor fraction in line 29. Main fractionator 24 operates at a top pressure in the range of about 2–15 psig.

In the drawing, the vapor fraction from line 29 flows through condenser 30 for condensing light naphtha, then via line 31 into low pressure accumulator 32. In low pressure accumulator 32, condensed light naphtha separates from non-condensed vapors comprising hydrogen, hydrogen sulfide, $C_1$–$C_4$ hydrocarbons, and stripping gasses carried over from regenerated catalyst stripper 9. From low pressure accumulator 32 a first portion of light naphtha is recycled via line 33 to main fractionator 24, and a second portion of light naphtha is removed via line 34.

In the drawing, non-condensed vapors from low pressure accumulator 32 flow via line 35 to gas compressor 36 wherein the non-condensed vapors are compressed to about 150–250 psig, and flow from gas compressor 36 via line 37 to high pressure condenser 38 for condensing a substantial portion of $C_4$ and heavier hydrocarbons present in the con-condensed vapors. From high pressure condenser 38, non-condensed gases and condensate flow via line 39 into high pressure accumulator 40 wherein the condensate, comprising $C_4$ and heavier hydrocarbons and non-condensed gases comprising hydrogen, hydrogen sulfide, stripping gases, and $C_1$–$C_4$ hydrocarbons are separated into a liquid phase and a gas phase. The liquid phase flows from high pressure separator 40, via line 41, to a debutanizer column, not shown. Non-condensed gases flow from high pressure accumulator 40, via line 42 to a lower portion of absorber column 43.

In the drawing, light naphtha from line 34 flows into the top of absorber 43 and contacts, in counter current flow, the non-condensed gases for absorbing a substantial portion of $C_3$ and heavier hydrocarbons therefrom. Naphtha, containing absorbed $C_3$+hydrocarbons flows from the bottom of absorber 43 via line 44 to said debutanizer column, not shown. Absorber off gases comprising hydrogen, hydrogen sulfide, stripping gases, and $C_1$–$C_3$ hydrocarbons flow from the top of absorber 43 via line 45 to the lower portion of sponge absorber 46.

In the drawing, light cycle gas oil, flowing from line 27 via line 47, enters the upper portion of sponge absorber 46 wherein the light cycle gas oil absorbs substantially all $C_3$ and heavier hydrocarbons from the absorber off gas. Light cycle gas oil containing absorbed $C_3$+hydrocarbons flows from the bottom of sponge absorber 46 via line 48 as recycle to main fractionator 24. Sponge gas absorber off gas, comprising hydrogen, hydrogen sulfide, stripping gases, and $C_1$–$C_2$ hydrocarbons flows overhead from sponge absorber 46 via line 49 to the lower portion of acid gas absorber 50.

In the drawing, lean diethanol amine, or other acid gas absorbent, flows via line 51 into the upper portion of acid gas absorber 50, wherein the diethanol amine absorbs substantially all hydrogen sulfide and other acid gases, e.g. $CO_2$, from the sponge absorber off-gas. From the bottom of acid gas absorber 50, diethanol amine containing absorbed acid gases flows via line 52 to amine stripper 53. In amine stripper 53, absorbed acid gases are stripped from the diethanol amine by application of heat, reduction of pressure, and/or use of stripping gas. Stripped acid gases, comprising hydrogen sulfide and acidic stripping gases carried over from regenerated catalyst stripper 9 flow from amine stripper 53 into line 10. From line 10, the stripped acid gases flow from line 10 through distributor ring 11 into regenerated catalyst stripper 9 for stripping nitrogen and other non-condensible gases from the regenerated catalyst, as hereinabove described.

In the drawing, gases not absorbed in amine absorber 50, comprising hydrogen and $C_1$-$C_2$ hydrocarbon flow via line 55 to cryogenic separator 56. In cryogenic separator 56 hydrocarbons are condensed and hydrogen remains in the gas phase. From cryogenic separator 56 hydrocarbons are recovered via line 57 for further processing, such as ethylene recovery, or use as fuel gas.

Hydrogen product, comprising hydrogen in at least about 80% purity is recovered from cryogenic separator 56 via line 58, at a pressure of about 100–150 psig. Such hydrogen may be further compressed for recovery as a product or may be employed in refinery processes such as hydrodesulfurization, hydrocracking, etc.

Purity of hydrogen recovered in line 58 should be at least about 80%, and preferably is about 95% for such hydrogen to be a commercially useful product. Hydrogen purity is determined by effectiveness of cryogenic separator 56 in removing light hydrocarbons and effectiveness of regenerated catalyst stripper 9 in removing non-condensible gases, e.g. nitrogen and carbon monoxide, from the regenerated catalyst before entry into riser 14. Operation of cryogenic separators for condensing light hydrocarbons is well known and widely practiced upon a commercial basis.

Stripping non-condensible gases in regenerated catalyst stripper 9 depends upon effectively displacing entrained regeneration gases from the pores and interstitial spaces of regenerated catalyst entering from regeneration vessel 2. A major portion of entrained regeneration gasses may be displaced from the regeneration catalyst interstitial spaces and large pores by a countercurrent flow of a stripping gas is an amount equivalent, in standard cubic feet, to about the volume of fluidized catalyst entering regenerated catalyst stripper 9. Additional regeneration gases may be displaced from smaller catalyst pores by increasing the volume of stripping gases. Complete removal of regeneration gasses from the smallest catalyst pores is not commercially practical, and the practical limit of stripping gas is equivalent to about 4 standard volumes of stripping gas per volume of catalyst entering regenerated catalyst stripper 9.

Without regenerated catalyst stripping, the ratio of hydrogen to non-condensible gases such as nitrogen in the amine absorber 50 off-gas flowing in line 55 is approximately 1:1. Thus, even with cryogenic separation of light hydrocarbons, the hydrogen purity would be only about 50% and the hydrogen product would have little or no commercial utility. With regenerated catalyst stripping, employing a volume of stripping gas about equal to the volume of regenerated catalyst, the purity of the hydrogen from cryogenic separator 56 may be increased to about 80%, which is about minimum hydrogen purity for commercial utility. Increased stripping gas rates increase displacement of regeneration gas such that at about four volumes of stripping gas per volume of regenerated catalyst in regenerated catalyst stripper 9, the purity of hydrogen in line 58 is increased to about 95%.

Thus, from the above specification, fluidized catalytic cracking processes are disclosed with improvements for recovering a hydrogen product of commercially useful purity and substantially free of non-condensible gases (e.g. nitrogen and carbon monoxide). The detailed description of the process of the present invention disclosed herein is for the best mode of operation of which applicants are aware, and it is recognized that many variations and modifications of the disclosed process will occur to those skilled in the art. Therefore, all such variations and modifications which are within the spirit and scope of the appended claims are to be included in the present invention.

We claim:

1. In a fluidized catalytic cracking process wherein: (1) a petroleum fraction containing sulfur compounds convertible to hydrogen sulfide is contacted with regenerated catalyst in a reaction zone under cracking conditions for the production of cracked vapor and coke contaminated spent catalyst, (2) wherein said cracked vapors are separated into a plurality of fractions including a stripped acid gas fraction comprising hydrogen sulfide and a hydrogen product fraction comprising hydrogen, (3) wherein spent catalyst from said reaction zone is regenerated in a regeneration zone by burning coke therefrom with air, and (4) wherein hot regenerated catalyst from the regeneration zone is contacted with additional quantities of said petroleum fraction containing sulfur compounds, the improvement for enhancing the hydrogen content of said hydrogen product stream which comprises the steps of:
(a) removing regenerated catalyst containing entrained nitrogen and carbon oxides from said regeneration zone into a regenerated catalyst stripping zone;
(b) in said regenerated catalyst stripping zone, stripping said regenerated catalyst with hydrogen sulfide in an amount sufficient to substantially remove the entrained nitrogen and the carbon oxides from said regenerated catalyst; and
(c) contacting said additional quantities of said petroleum fraction containing sulfur compounds in said reaction zone with said thus-stripped regenerated catalyst whereby the hydrogen content of said hydrogen product stripping is significantly enhanced.

2. A method as in claim 1 wherein the regenerated catalyst is stripped in the catalyst stripping zone with an amount of said stripped acid gas function sufficient to provide the hydrogen sulfide necessary for the substantial removal of entrained nitrogen and carbon oxides.

3. A method as in claim 2 wherein said regenerated catalyst is stripped in said stripping zone with one to four standard cubic feet of said stripped acid gas fraction per standard cubic foot of catalyst, whereby the amount of hydrogen in said hydrogen product stream will be increased from about 50 percent to at least about 80 percent.

* * * * *